May 13, 1941.  O. E. FISHBURN  2,242,026
TRANSMISSION SYNCHRONIZING MECHANISM
Filed May 23, 1938
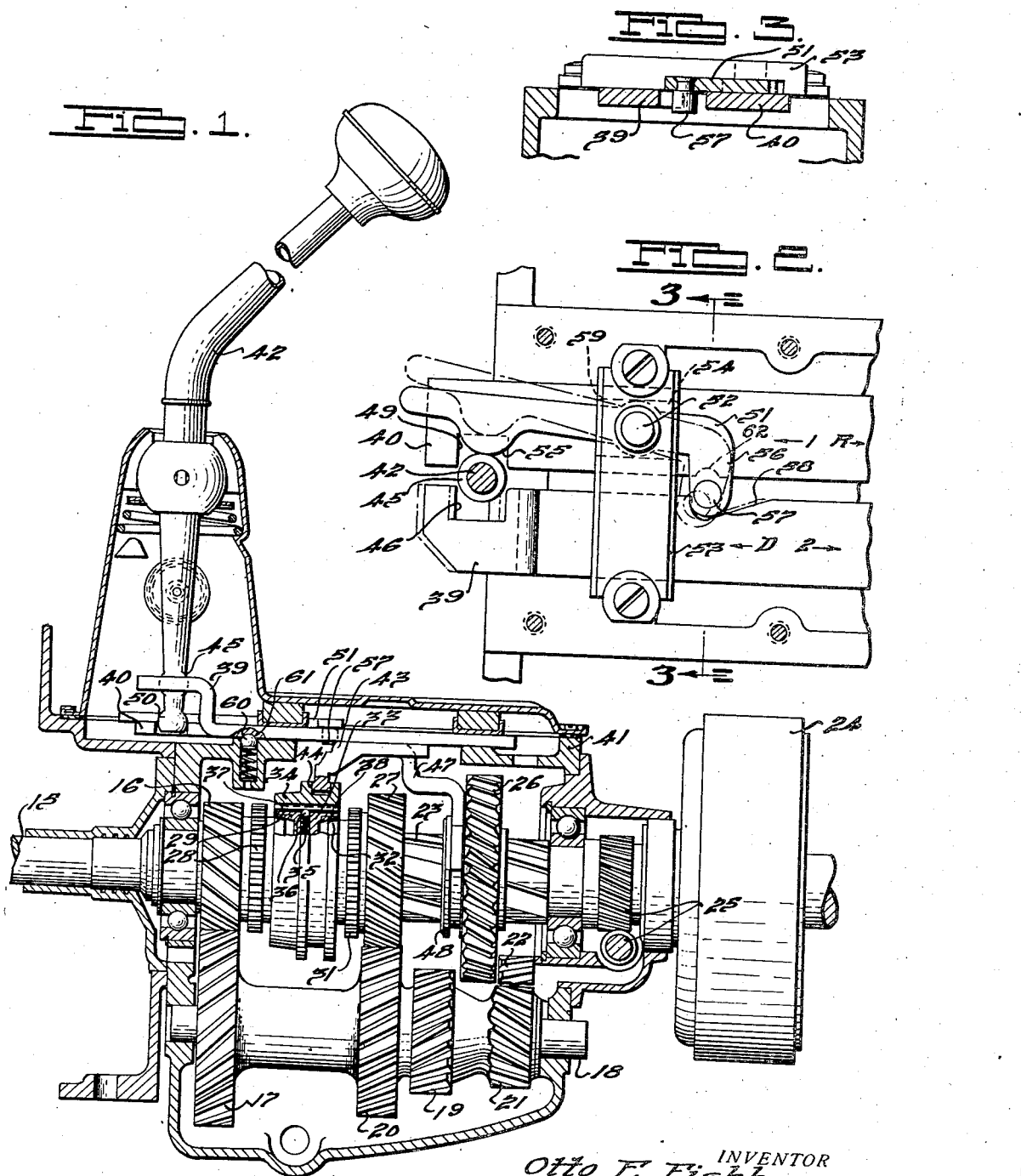
INVENTOR
Otto E. Fishburn.
BY
Harness, Dind, Pates Harris
ATTORNEYS.

Patented May 13, 1941

2,242,026

UNITED STATES PATENT OFFICE 2,242,026

TRANSMISSION SYNCHRONIZING MECHANISM

Otto E. Fishburn, Detroit, Mich., assignor to Chrysler Corporation, Highland Park, Mich., a corporation of Delaware Application May 23, 1938, Serial No. 209,516

3 Claims. (Cl. 74—339)

This invention relates to motor vehicle transmissions and refers more particularly to improvements in synchromesh mechanisms for use with such transmissions.

An object of the invention is to provide improved means for synchronizing the speeds of shafts preparatory to positively clutching the shafts together, such means being of a simple construction and having the characteristics of economy and long life.

Another object of the invention is to provide improved means for controlling operation of synchronizing means for the above purposes.

Transmissions of the foregoing type generally employ a plurality of drive control means such as, for instance, intermeshable gears, for establishing a plurality of variable driving connections between a driving shaft and a shaft adapted to be driven thereby. It is conventional practice to provide means for synchronizing the speeds of these shafts preparatory to establishing a driving connection therebetween, such synchronizing means being effective only when the transmission control mechanism is manipulated to establish certain predetermined driving connections. Generally such synchronizing means is effective only when the transmission mechanism is manipulated to establish a direct driving connection between the driving and driven shafts and a further driving connection intermediate direct and low speed driving connections.

Another object of the invention is to provide means for actuating a synchronizing means of the foregoing type preparatory to establishing a low speed driving connection; and to utilize the same in connection with the reverse driving connection of the transmission. More specifically, the invention provides improved means for controlling operation of a synchronizing means of the foregoing type whereby its normal range of effectiveness is extended. The invention permits the use of a simple, compact synchronizing means or unit which is operable to effect easy and smooth engagement of the means for providing the various driving connections between the driving and driven shafts.

Other objects and advantages of the invention will be more apparent from the following description taken in connection with the accompanying drawing, in which:

Fig. 1 is a sectional elevational view through a transmission embodying the invention.

Fig. 2 is a fragmentary top plan view illustrating a portion of the transmission control mechanism shown in Fig. 1.

Fig. 3 is a sectional view taken as indicated by the line 3—3 of Fig. 2.

Referring to the drawing, the invention is illustrated in connection with a motor vehicle transmission now in general use and in which is incorporated a synchronizing means, although I desire to point out that the improvements are applicable to other types of transmission mechanism and other forms of synchronizing means where it is desired to synchronize and drivingly couple a pair of rotating members. The conventional transmission illustrated in Fig. 1 comprises a driving shaft 15 which is adapted to be driven by the usual engine, preferably through the medium of the well known main clutch, the engine and clutch not being illustrated in my drawings as they may be of any well known form and arrangement such as now used in motor vehicles.

The driving shaft 15 carries the main driving gear 16 for rotation therewith, this gear being in constant mesh with the gear 17 of the countershaft gear cluster mounted for rotation on the countershaft 18. This gear cluster, according to well known practice, comprises a low speed gear 19, a second speed gear 20, and a reverse gear 21 which is in constant mesh with the reverse idler gear 22. The transmission driven shaft 23 extends rearwardly to drive the ground wheels of the vehicle, the usual propeller shaft brake being illustrated at 24 and the speedometer driving gears being illustrated at 25.

The driven shaft 23 has mounted thereon the low speed and reverse gear 26 splined to the driven shaft for selective meshing with the countershaft low speed gear 19 or the reverse idler gear 22 for respectively transmitting a low speed drive to the driven shaft 23 or the drive thereto in a reversed direction. Freely rotatable on shaft 23 is the second speed gear 27 in constant mesh with the countershaft gear 20 for transmitting a second speed ratio drive as will be presently more apparent. The gear 16 drivingly carries a set of circumferentially spaced external clutch teeth 28 and one element of a synchronizing friction clutch preferably in the form of a cone 29. For convenience of manufacture it is preferable to form the clutch teeth 28 and cone 29 integrally with the body portion of the gear 16. In a similar manner the gear 27 drivingly carries a set of clutch teeth 31 and a cone 32.

Splined on the shaft 23 adjacent the forward extremity thereof is a hub 33 having splined thereon an axially shiftable collar or sleeve 34. The hub 33 is formed with a plurality of circumferentially spaced outwardly opening pockets each of which receives a spring as indicated at 35 yieldably urging a ball detent 36 outwardly into engagement with a registering recess in the inner periphery of the collar 34 for yieldably maintaining the collar and hub against relative axial movement. The hub 33 has axially oppositely extending portions 37 and 38 overlapping respectively the cones 29 and 32, each of the portions 37 and 38 having an inner peripheral surface corresponding to that of the adjacent overlapping portion.

The transmission is illustrated in its neutral position. To establish the direct driving connection between shafts 15 and 23, the collar 34 is shifted axially to the left as viewed in Fig. 1 by the control means hereinafter described to engage the teeth 28 drivingly connected to the gear 16 carried by the driving shaft 15, and when so connected, the collar is also drivingly connected with the hub 33 which is in turn drivingly carried by the shaft 23. As the collar is thus shifted, the hub 33 is carried therewith, due to the ball detent connection between collar and hub, so that the overlapping portion 37 of the hub frictionally engages the cone 29 associated with gear 16 to synchronize the speeds of the shafts 15 and 23 prior to engagement of the collar 34 and teeth 28. When the cone 29 and portion 37 are thus frictionally engaged, the detent connection between the hub and collar is broken and the latter continues axially to engage teeth 28 to establish the direct driving connection. The second speed driving connection is established by similarly moving the collar 34 to the right as viewed in Fig. 1 to engage teeth 31 formed integrally with gear 27, and when thus shifted, the overlapping portion 38 of the collar engages the cone 32 to synchronize the speeds of the parts 31 and 32 to be clutched together, it being understood that the part 31 is being driven from the shaft 15 and the part 32 from the shaft 23.

The foregoing mechanism is a typical embodiment of a transmission and synchronizing means conventionally employed in motor vehicles. It will be understood, of course, that transmission mechanisms of the type illustrated operate in connection with a clutch (not shown) for controlling the drive from the usual engine to the shaft 15, and that the clutch is operated to release the drive to the shaft 15 prior to establishing the aforesaid driving connections.

The transmission drives are selectively controlled by a mechanism including a pair of longitudinally shiftable rails 39 and 40 supported by the transmission casing 41 and a rockably supported shifter lever 42. The rail 39 is adapted to selectively operate the collar 34 in the manner aforesaid to selectively established the direct and second speed driving connections and for this purpose is provided with a yoke 43 engaged in an annular groove 44 in the periphery of the collar 34. In effecting the direct driving connection the lever 42 is moved from its neutral position as shown to engage the enlarged portion 45 thereof in the notch 46 of the rail 39 and the lever is then rocked to effect movement of the rail 39 to the left as viewed in Figs. 1 and 2. For establishing the second speed driving connection, the lever 42 is similarly rocked to move the rail 39 in the opposite direction.

The rail 40 is adapted to selectively establish the low and reverse driving connections and for this purpose is provided with a yoke 47 engaged in an annular groove 48 formed in the hub of gear 26. The rail 40 has a notch 49 therein disposed opposite the notch 46 when the transmission is in a neutral position and the notch 49 is adapted to receive the enlarged end portion of the lever 42 whereby the rail is caused to be moved to the left as viewed in Figs. 1 and 2 to effect the low speed driving connection and is movable to the right to effect the reverse driving connection. In the form of the invention herein illustrated, the synchronizing means or unit consists of a bidirectional axially shiftable hub 33 having the overhanging portions 37 and 38 frictionally engageable with the cones 29 and 32 respectively. Heretofore in transmission mechanisms of the type illustrated, the synchronizing unit has been effective only when the rail 39 is actuated to establish the direct and second speed driving connections. In carrying out the objects of the invention, I have provided means for effecting operation of the synchronizing means aforesaid in response to the operation of selectively operable control means to establish the low speed and reverse driving connections. In the form of the invention herein illustrated, a lever 51 is pivotally mounted by a pin 52 carried by a cross member 53 which retains the rails 39 and 40 against vertical displacement relative to the transmission housing 41. The cross member 53 has a slotted portion 54 in the lower face thereof for accommodating the lever 51. The latter has a laterally extending boss portion 55 registering with and normally overlapping the notch 49 in rail 40 when the transmission is in neutral position. The opposite end portion of the lever 51 is flanged laterally as at 56 toward the rail 39 and has a downwardly extending pin 57 which is adapted to engage the wall of a slot 58 formed in the adjacent longitudinal edge of the rail 39 as hereinafter set forth. The rail 40 has relief notch 62 into which the pin 57 may extend to provide the clearance between the latter and the rail 39 to accommodate shifting of this rail.

As an example of the operation of the mechanism described immediately above, let it be assumed that the vehicle is at rest and the engine is operating to drive the shaft 15, the conventional clutch mechanism intermediate the engine and shaft 15 is engaged, the transmission is in neutral position, in which instance the gear 16 is driving the low speed gear 19, and the operator desires to establish the low speed drive connection by engaging gears 26 and 19. The clutch mechanism is operated in a manner to release the drive shaft 15 and the driver operable member or gear shift lever 42 is rocked transversely to engage the enlarged portion 50 thereof in the notch 49 of the control rail 40. As the lever is so rocked, it engages the boss portion 55 of lever 51 and rotates the latter in a clockwise direction as viewed in Fig. 2, whereupon the lever is moved to the position shown in dotted lines in Fig. 2. During this movement, the lever 51 engages the wall of the slot 54 as indicated at 59 and the pin 57 engages the wall of slot 58 to shift the rail 39 forwardly against the action of the spring pressed detent 60 engaging in a depression 61 in the lower surface of rail 39 for maintaining the latter in its neutral position. As the rail is shifted the detent 60 engages the inclined face of the depression 61. This shifting movement of the rail 39 is sufficient to cause a corresponding movement of the hub 33 to frictionally engage the cone 29 to reduce the speed of the shaft 15 and the gears driven thereby including the low speed gear 19, it being understood that under the conditions set forth above the gear 26 is at rest and shaft 15 and the gearing associated therewith may continue to rotate after release of the clutch mechanism due to inertia of the parts, or to a failure of the vehicle operator to operate the clutch mechanism in a manner to effect a complete release of the drive to the shaft 15. The lever 42 is then rocked longitudinally with respect to the vehicle to cause the rail 40 to shift the gear 26 axially into engagement with the gear 19. For establishing the reverse driving connection, the lever 42 is rocked in the opposite longitudinal direction to move the rail 40 rearwardly whereby the gear 26 is correspondingly moved to engage the reverse gear 21, it being understood that the synchronizing means is actuated in the manner set forth in connection with the establishment of the low speed driving connection. The synchronizing means is so constructed and arranged that but slight movement of the rail 39 is required in order to effect operation thereof and that the shifting of the rail 39 through the lever arm 51 is sufficient to effect operation of the synchronizing means without engagement of the driving connections normally controlled by the rail 39. When the lever 42 is returned to its normal position to establish the neutral condition of the transmission, as illustrated, the spring pressed ball detent 60 acting on the inclined face of the depression 61 causes the rail to be shifted to its normal neutral position.

It will be noted from the foregoing that operation of the synchronizing means is effected prior to shifting rail 40 for establishing a driving connection. This is important in transmissions where the axial clearances between the gears to be engaged are relatively slight and it is therefore preferred to effect operation of the synchronizing means prior to operation of the control rail.

The invention is not limited in the broader aspects thereof to the particular combination and arrangement of parts such as are shown and described for illustrative purposes since various modifications will be apparent from the teachings of the invention and scope thereof as defined in the appended claims.

What I claim is:

1. In a change speed mechanism; a driving member; a member adapted to be driven from said driving member; means respectively driven with said members for establishing driving connections of relatively different ratios therebetween; means respectively driven with said members and engageable for synchronizing the speeds thereof prior to establishment of said driving connections therebetween; a plurality of rails respectively movable to establish said driving connections, one only of said rails being operable upon initial movement thereof to effect engagement of said synchronizing means prior to establishing the drive connection controlled thereby, a vehicle driver operable member having a neutral position with respect to said rails and being selectively movable therefrom to a position for moving the latter, and means responsive to movement of said member from its first said position to its said second position for effecting said initial movement of the said one of said rails.

2. In a change speed mechanism; a driving member; a member adapted to be driven from said driving member; means respectively driven with said members for establishing driving connections of relatively different speed ratios therebetween; means respectively driven with said members and operable when engaged to vary the relative speeds of said members prior to establishment of said connections therebetween; a plurality of shiftable elements operable to selectively effect establishment of said drive connections and said further drive connection respectively, a vehicle driver operable member selectively movable to engage said elements for operation thereof, and means responsive to movement of said member to selectively engage one of said elements for causing another of said elements to effect engagement of said speed varying means prior to shifting of the element selectively engaged.

3. In a power transmitting mechanism; coaxial driving and driven shafts; gearing means carried by said shafts respectively; clutch teeth driven by said driving shaft; a countershaft having gearing thereon in constant mesh respectively with the gearing means on said shafts; a collar drivingly connected with said driven shaft and axially movable to positively engage with said clutch teeth for establishing a driving connection between said shafts; friction clutch members respectively driven with said shafts engageable one with the other in response to initial axial movement of said collar to vary the relative speeds of said shafts; gear means respectively carried by said driven shaft and said countershaft and relatively shiftable to establish a further driving connection between said driving and driven shafts; a vehicle driver operable member selectively movable to axially move said collar and to effect said relative shifting of said gearing means to establish said further driving connection respectively, and means responsive to movement of said driver operable member to establish said last mentioned driving connection for effecting said initial axial movement of said collar.

OTTO E. FISHBURN.